(12) United States Patent
Job

(10) Patent No.: US 7,506,540 B1
(45) Date of Patent: Mar. 24, 2009

(54) AUTOLOCATION OF WIRELESS TIRE PRESSURE MONITORING SENSORS

(75) Inventor: William P. Job, Armada, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/036,025

(22) Filed: Feb. 22, 2008

(51) Int. Cl.
*B60C 23/02* (2006.01)

(52) U.S. Cl. ...................................... 73/146.5; 340/447
(58) Field of Classification Search ............... 73/146, 73/146.5; 340/445, 447
See application file for complete search history.

(56) References Cited

U.S. PATENT DOCUMENTS

| | | | |
|---|---|---|---|
| 6,362,731 B1 * | 3/2002 | Lill | 340/445 |
| 6,788,193 B2 * | 9/2004 | King et al. | 340/447 |
| 6,897,770 B2 * | 5/2005 | Lill | 340/445 |
| 7,250,851 B2 * | 7/2007 | Lefaure | 340/445 |
| 7,256,687 B2 * | 8/2007 | Shibata | 340/447 |
| 7,385,494 B2 * | 6/2008 | Mori et al. | 340/442 |
| 2003/0020605 A1 * | 1/2003 | Starkey | 340/447 |
| 2004/0055370 A1 * | 3/2004 | Normann et al. | 73/146 |
| 2006/0042368 A1 * | 3/2006 | Hirota | 73/146 |
| 2008/0127723 A1 * | 6/2008 | Lin | 73/146.4 |

* cited by examiner

*Primary Examiner*—Andre J Allen

(57) ABSTRACT

A tire pressure monitoring system (TPMS) for a vehicle, and related operating methods are provided. The TPMS includes a plurality of tire pressure sensors, each being configured to wirelessly transmit respective sensor signals, and a wireless receiver configured to wirelessly receive and process sensor signals transmitted by the tire pressure sensors. The location of the wireless receiver is biased toward the fore or aft of the vehicle. The wireless receiver has an adjustable sensitivity setting that accommodates wireless signal reception in a key fob mode and a TPMS mode. One operating method for the TPMS involves wirelessly receiving sensor signals transmitted by the tire pressure sensors, determining respective received signal strength (RSS) values for the received sensor signals, and processing the RSS values to resolve whether the received sensor signals were transmitted by a fore tire pressure sensor or an aft tire pressure sensor.

20 Claims, 3 Drawing Sheets

AUTOLOCATION OF WIRELESS TIRE PRESSURE MONITORING SENSORS

TECHNICAL FIELD

The subject matter described herein generally relates to tire pressure monitoring systems, and more particularly relates to an autolocation technique that determines the tire pressure sensor location among the four tires.

BACKGROUND

Tire pressure monitoring systems (TPMSs) for vehicles are known in the prior art. A TPMS provides monitoring of tire inflation levels in all four tires of a vehicle, and a typical TPMS makes the tire inflation data available to the driver. A sensor/transmitter unit mounted on each wheel rim periodically transmits a sensor signal that conveys tire pressure information at a specified frequency to a receiver mounted elsewhere onboard the vehicle. The sensor/transmitter unit is a combination of an air pressure sensor and a radio frequency (RF) transmitter that encodes data in a manner suitable for RF broadcasting. The receiver, which is usually located in the passenger compartment, can be integrated with (or connected to) an in-dash TPMS display that alerts the driver if tire pressure is too low.

A tire pressure sensor for a TPMS may be ignorant of its deployed fore-aft location. Accordingly, a TPMS may perform a learning routine that enables the TPMS to determine, for each received tire pressure signal, the location of the originated tire pressure sensor signal. As a result of the learning routine, the TPMS can determine whether a received tire pressure signal was transmitted by the left front sensor, the left rear sensor, the right front sensor, or the right rear sensor. Some vehicles require a manual learning routine that must be performed at the manufacturing plant (before the initial deployment of the vehicle). This involves putting the TPMS into the learning mode, and thereafter removing air from each tire to initiate transmission by the sensor. Unfortunately, this manual learning routine must also be performed (by a mechanic, the operator, the owner, etc.) whenever the tires are replaced or rotated.

BRIEF SUMMARY

A method is provided for operating a tire pressure monitoring autolocation system for a vehicle. The tire pressure monitoring system includes a plurality of tire pressure sensors, each being configured to wirelessly transmit respective sensor signals, and a wireless receiver configured to wirelessly receive and process sensor signals transmitted by the tire pressure sensors, where the location of the wireless receiver is biased toward the fore or aft of the vehicle. The method involves: wirelessly receiving sensor signals transmitted by the tire pressure sensors, to obtain received sensor signals; determining respective received signal strength (RSS) values for the received sensor signals, to obtain a plurality of RSS values; and processing the plurality of RSS values to resolve whether the received sensor signals were transmitted by a fore tire pressure sensor or an aft tire pressure sensor.

Another method is provided for operating a tire pressure monitoring autolocation system for a vehicle having a plurality of tire pressure sensors, each being configured to wirelessly transmit respective sensor signals. The method involves: wirelessly receiving sensor signals transmitted by the tire pressure sensors, to obtain received sensor signals at an onboard wireless receiver that is biased toward the fore/aft of the vehicle; and determining respective RSS values for the received sensor signals, to obtain a plurality of RSS values. For each of the received sensor signals, the method indicates that the received sensor signal was transmitted by a fore/aft tire pressure sensor if the respective RSS value is relatively high, and the method indicates that the received sensor signal was transmitted by an aft/fore tire pressure sensor if the respective RSS value is relatively low.

A tire pressure monitoring system for a vehicle is also provided. The system includes: a wireless receiver configured to receive tire pressure sensor signals transmitted by a plurality of tire pressure sensors, where the location of the wireless receiver being biased toward the fore/aft of the vehicle; and a processing architecture coupled to the wireless receiver. The processing architecture is suitably configured to obtain an RSS value for each received tire pressure sensor signal, and, for each of the received tire pressure sensor signals, assign a fore/aft tire designation if the respective RSS value is relatively high, or assign an aft/fore designation if the respective RSS value is relatively low.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

At least one embodiment of the present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of data transmission protocols and that the system described herein is merely one suitable example.

For the sake of brevity, conventional aspects of tire pressure monitoring, wireless signal processing, RF data transmission, RF antenna design, RF receiver design, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Figure 1:
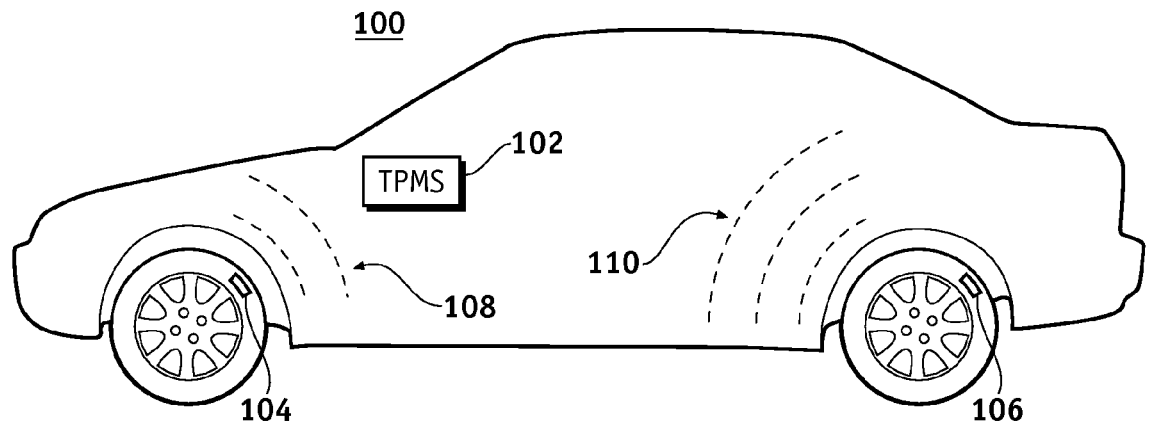
FIG. 1 is a side phantom view of a vehicle with an embodiment of a TPMS deployed therein.

FIG. 1 is a side phantom view of a vehicle 100 having an onboard TPMS deployed therein. Vehicle 100 generally includes a TPMS unit 102 that is able to communicate with at least one RF sensor-transmitter. Although not shown in FIG. 1, TPMS unit 102 preferably includes at least an RF receiver, an antenna, and a processor. TPMS unit 102 may also include or communicate with a suitably configured user interface, such as a display element, that enables TPMS unit 102 to convey tire pressure information to the driver of vehicle 100.

In this example, a separate and independent RF sensor-transmitter is utilized for each tire, and each RF sensor-transmitter is realized as a wheel-mounted tire pressure sensor (identified by reference numbers 104 and 106). In FIG. 1, the other two tire pressure sensors are hidden from view. Each tire pressure sensor 104/106 is suitably configured to transmit an RF signal intended for the RF receiver in TPMS unit 102. Thus, although not depicted in FIG. 1, each tire pressure sensor may include a suitably designed transmit antenna, which may be realized with the valve stem for the respective tire. In practice, each tire pressure sensor 104/106 measures the internal tire pressure for its associated wheel and generates a respective sensor signal that conveys tire pressure information. In certain embodiments, each sensor signal may also convey a sensor identifier that is unique within the TPMS. In certain embodiments, each sensor signal may also convey left/right (or clockwise/counterclockwise) information that indicates whether that sensor signal originated from a tire mounted on the left or right side of vehicle 100. FIG. 1 depicts the RF energy or sensor signal radiated by tire pressure sensor 104 with reference number 108, and the RF energy or sensor signal radiated by tire pressure sensor 106 with reference number 110.

The RF receiver of TPMS unit 102 is configured to receive the wireless sensor signals generated by the tire pressure sensors. Thus, although not depicted in FIG. 1, TPMS unit 102 includes a suitably designed receiver antenna, which may be realized as a simple printed monopole RF antenna located on a circuit board. In the embodiment described herein, the received sensor signals are subjected to processing by the TPMS, which is implemented as a suitable onboard vehicle system.

Figure 2:
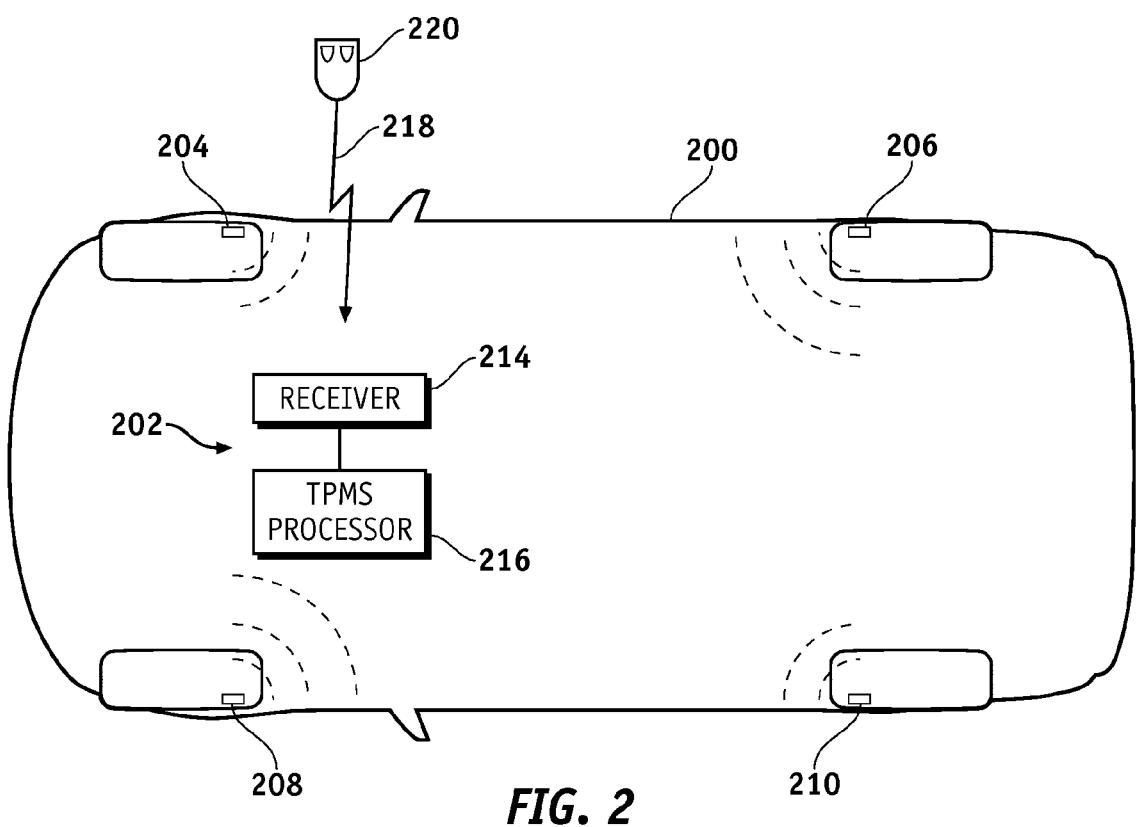
FIG. 2 is a schematic representation of a vehicle with an embodiment of a TPMS deployed therein.

FIG. 2 is a schematic representation of a vehicle 200 with an embodiment of a TPMS deployed therein. Certain features and components of the TPMS system of vehicle 200 are identical, similar, or equivalent to features and components of the TPMS system of vehicle 100, and such common features and components will not be redundantly described in the context of vehicle 200. Briefly, vehicle 200 includes a TPMS unit 202, and tire pressure sensors (identified by reference numbers 204, 206, 208, and 210). TPMS unit 202 includes a wireless receiver 214 coupled to a TPMS processing architecture 216. As depicted in FIG. 2, wireless receiver 214 may be further configured to wirelessly receive key fob signals 218 that are transmitted by a remote key fob 220 for vehicle 200. In practice, the frequency (or frequency band) of the TPMS sensor signals and the frequency (or frequency band) of the key fob signals 218 are similar or the same. As depicted in FIG. 2, a single integrated wireless receiver 214 is desirable for simplicity and ease of manufacturing. However, use of a common wireless receiver is not required, and two separate receivers can be employed in an alternate embodiment.

Processing architecture 216 is configured to process tire pressure information conveyed in the sensor signals received by wireless receiver 214. Processing architecture 216 is also suitably configured to obtain and analyze a quality of service characteristic or parameter of the received sensor signals, such as received signal strength (RSS). Moreover, processing architecture 216 can be configured to process received key fob signals 218 as necessary. In practice, processing architecture 216 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

Wireless receiver 214 is biased toward either the fore or the aft of vehicle 200. In other words, wireless receiver 214 is located closer to the front tires (biased toward the fore of vehicle 200) or closer to the rear tires (biased toward the aft of vehicle 200). This offset positioning is important because TPMS unit 202 relies upon the difference between the RSS of the received sensor signals. FIG. 2 depicts a deployment where wireless receiver 214 is biased toward the fore of vehicle 200, such that sensor signals generated by tire pressure sensors 204 and 208 will generally have a higher RSS than sensor signals generated by tire pressure sensors 206/210. For the sake of brevity and clarity, the following description only addresses the embodiment shown in FIG. 2. It should be appreciated that the concepts described herein can also be extended to systems where wireless receiver 214 is biased toward the aft of vehicle 200.

Figure 3:
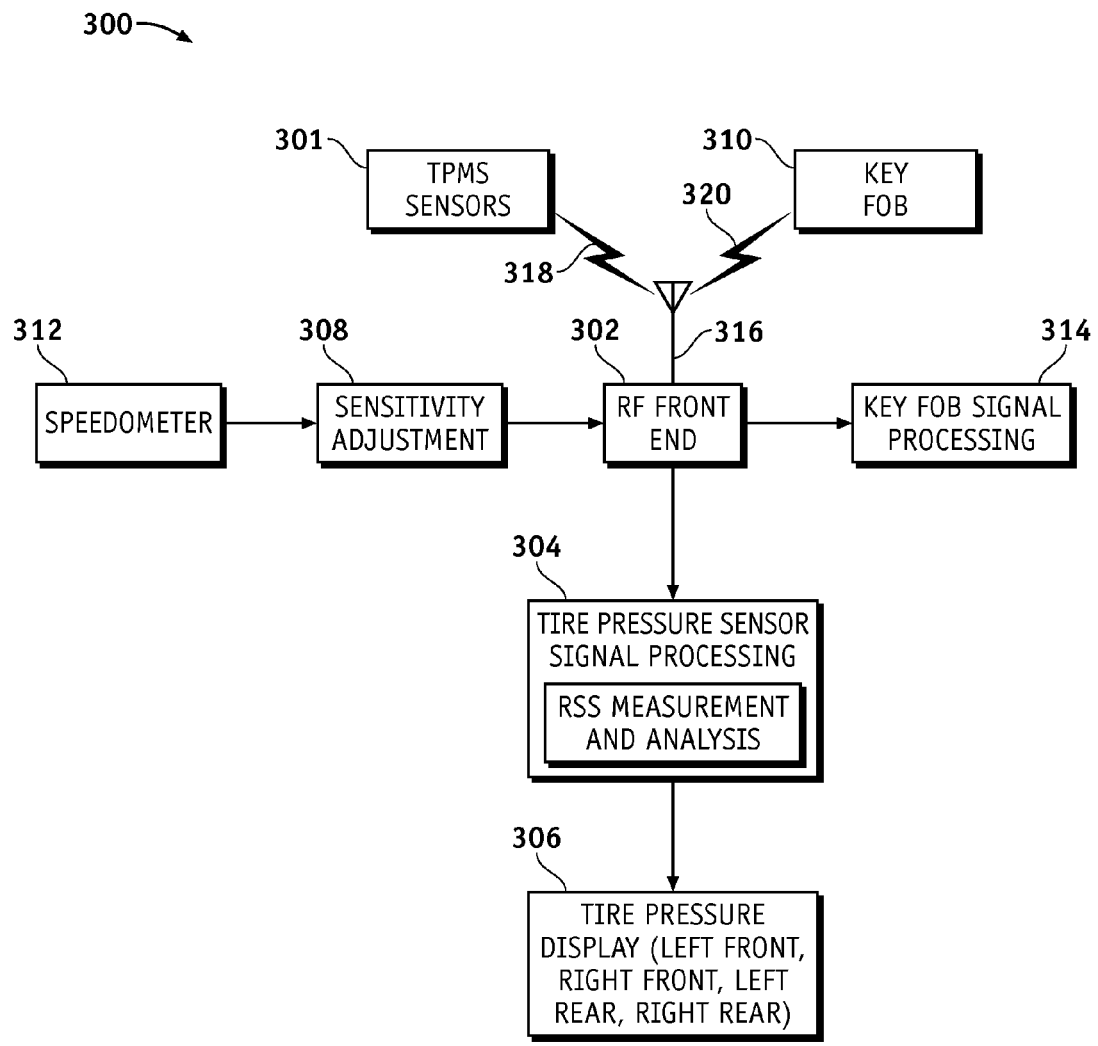
FIG. 3 is a schematic representation of an embodiment of a TPMS for a vehicle.

FIG. 3 is a schematic representation of an embodiment of a TPMS 300 for a vehicle. Certain features and components of TPMS 300 are identical, similar, or equivalent to features and components of the TPMS systems of vehicles 100 and 200, and such common features and components will not be redundantly described in the context of TPMS 300. As depicted in FIG. 3, TPMS 300 generally includes, without limitation: a plurality of TPMS sensors 301; a wireless receiver having an RF front end 302; a processing module 304 configured to process received tire pressure sensor signals; a tire pressure display element 306; and a processing module 308 configured to control sensitivity adjustments of RF front end 302. As described in more detail below, TPMS 300 may cooperate with a wireless key fob 310 for the vehicle, and with a speedometer 312 of the vehicle. Moreover, TPMS 300 may include or cooperate with a processing module 314 that is configured to process received key fob signals.

In certain embodiments, RF front end 302 is shared by TPMS 300 and key fob signal processing module 314. Accordingly, the wireless receiver may utilize a single RF antenna 316 to receive wireless TPMS sensor signals 318 and wireless key fob signals 320. Under normal operating scenarios, key fob 310 is used when the vehicle is stationary—key fobs are typically used to lock and unlock doors, to lock and unlock trunks or hatchbacks, to activate windows, to activate the ignition, to activate or deactivate alarms, etc. These operations are usually (if not exclusively) performed while the vehicle is parked. Moreover, it is usually desirable to maximize the wireless range of key fob 310. In this regard, the illustrated embodiment of TMPS 300 utilizes a wireless receiver having an adjustable receive sensitivity, and sensitivity adjustment processing module 308 is suitably configured to adjust the sensitivity of RF front end 302 to a relatively high sensitivity setting to accommodate reception of key fob signals 320. This high sensitivity setting increases the wireless range of key fob 310, relative to a lower sensitivity setting.

In contrast to key fob signals 320, TPMS sensor signals 318 need not travel a long distance and, therefore, the sensitivity of RF front end 302 can be lower (relative to the sensitivity used to receive key fob signals 320). Accordingly, sensitivity adjustment processing module 308 is suitably configured to adjust the sensitivity of RF front end 302 to a relatively low sensitivity setting to accommodate reception of TPMS sensor signals 318 without saturating the wireless receiver. The adjustable sensitivity of the wireless receiver is desirable because otherwise an RF receiver having a high dynamic range (and corresponding increased complexity and cost) would be necessary to tolerate the required signal strength variations. In practice, the variable sensitivity of the wireless receiver can be achieved using an adjustable input attenuator or any controllable feature or element.

Figure 4:
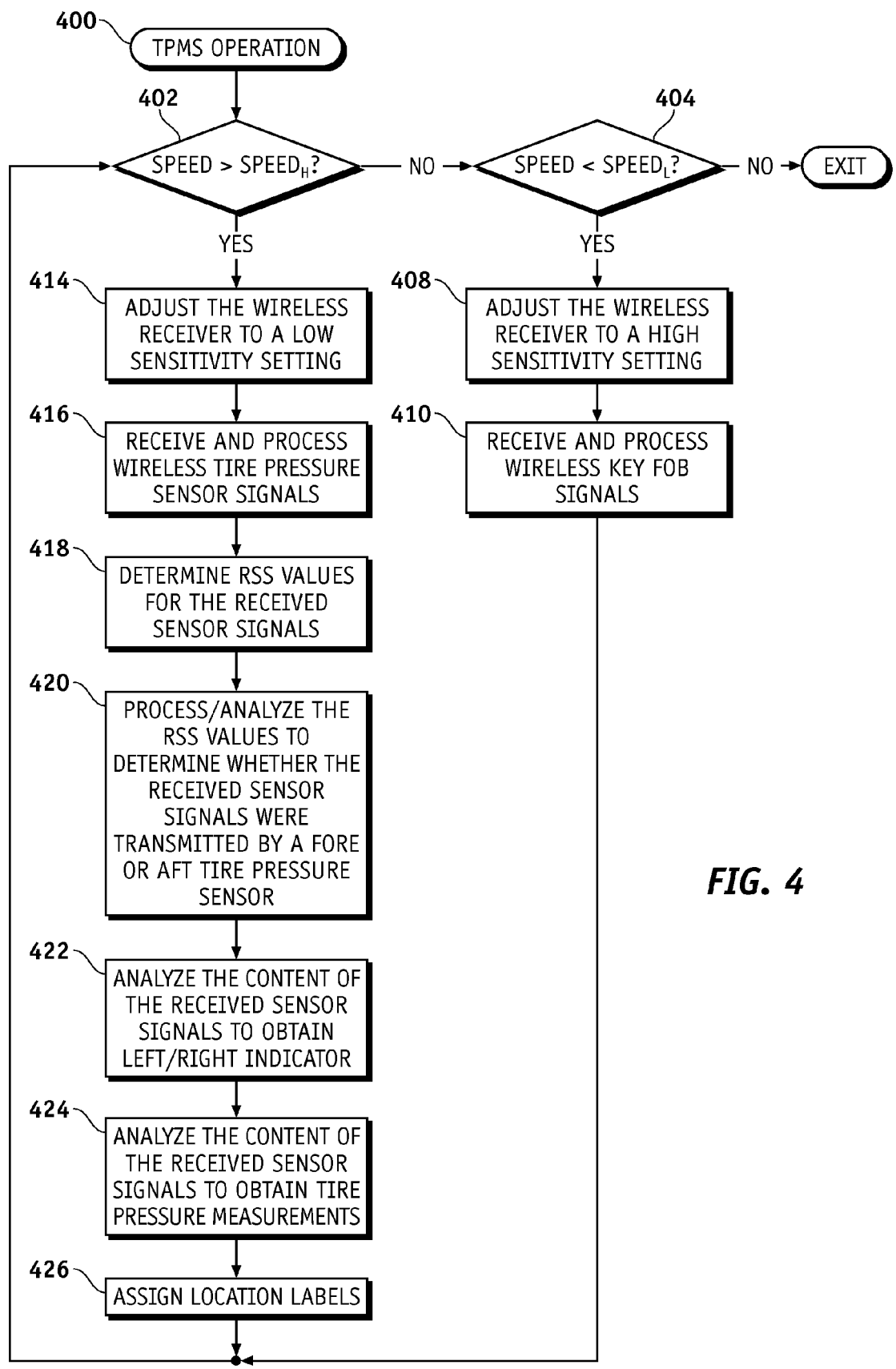
FIG. 4 is a flow chart that illustrates an embodiment of a method of operating a TPMS.

When TPMS 300 is operating in a key fob reception mode, key fob signal processing module 314 obtains and processes key fob signals 320, and initiates appropriate controls in a conventional manner. On the other hand, when TPMS 300 is operating in a sensor signal reception mode, tire pressure sensor signal processing module 304 obtains and processes TPMS sensor signals 318 in the manner described in more detail below. In this regard, FIG. 4 is a flow chart that illustrates a process 400 corresponding to TPMS operation in an exemplary embodiment. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., a tire pressure sensor, the wireless receiver, a processing architecture or module, or a display element. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

Process 400 (or portions thereof) can be performed while the host vehicle is stationary or in motion, and regardless of the position of the ignition switch. This allows process 400 to respond to remote key fob commands (typically transmitted while the vehicle is parked) and to respond to TPMS sensor signals (typically transmitted while the vehicle is moving). In practice, the TPMS sensor location technique can be performed once per ignition cycle, which is desirable to ensure that the TPMS system will be configured properly after all tire rotations and tire replacements. The illustrated embodiment of process 400 checks whether the current speed of the vehicle is greater than a stated high threshold speed (query task 402). As one non-limiting example, query task 402 may test whether the current speed exceeds 20 MPH, which is a typical minimum speed for proper operation of TPMS sensors. In alternate and equivalent embodiments, query task 402 can perform any appropriate speed comparison to determine when the vehicle is traveling at a relatively high speed.

If query task 402 determines that the vehicle is not traveling at a speed that exceeds the high threshold speed, then process 400 may check whether the current speed of the vehicle is less than a stated low threshold speed (query task 404). As one non-limiting example, query task 404 may test whether the current speed is less than 5 MPH. An alternate embodiment of process 400 can utilize a single threshold speed rather than a high threshold speed and a low threshold speed. In other words, the high threshold speed and the low threshold speed described above may actually be the same, e.g., 25 MPH. In other embodiments, query task 404 may test whether the vehicle is stationary or in a parked state, i.e., whether the current speed is 0 MPH.

If query task 404 determines that the vehicle is not traveling at a speed that is less than the low threshold speed, then process 400 may exit, idle, or be re-entered at query task 402 to continue monitoring the current speed of the vehicle. If query task 404 confirms that the vehicle speed is less than the low threshold speed, then process 400 may cause the system to enter a key fob reception mode, in lieu of or in favor of a TPMS reception mode. For example, process 400 may optimize the system settings for extended key fob range. In practice, the TPMS can remain active during the key fob reception mode (which enables the TPMS to detect a flat tire condition while the vehicle is parked, for example). Process 400 also adjusts the wireless receiver to a relatively high sensitivity setting (task 408) to accommodate reception of key fob signals, which may be of relatively low signal strength due to their potentially long transmission range. This allows the wireless receiver and the system to receive and process wireless key fob signals (task 410) transmitted by the remote key fob of the vehicle. Thus, process 400 initiates adjustment of the sensitivity of the wireless receiver (to the relatively high setting) when the vehicle is traveling at less than the low threshold speed. Following task 410, process 400 may be re-entered at query task 402 to continue monitoring the vehicle speed.

As described above, query task 402 compares the current vehicle speed to a high threshold speed. If query task 402 confirms that the vehicle speed is greater than the high threshold speed, then process 400 may cause the system to enter the TPMS reception mode, in lieu of or in favor of the key fob reception mode. For example, process 400 may reduce the sensitivity of the receiver and effectively reduce the operational range of the key fob. In this regard, process 400 also adjusts the wireless receiver to a relatively low sensitivity setting (task 414) to accommodate reception of TPMS sensor signals, which may be of relatively high signal strength due to the close proximity of the TPMS sensors to the wireless receiver. Entering the TPMS reception mode allows the wireless receiver and the system to receive and process wireless TPMS sensor signals (task 416) transmitted by the TPMS sensors. Thus, process 400 initiates adjustment of the sensitivity of the wireless receiver (to the relatively low setting) when the vehicle is traveling at greater than the high threshold speed.

For this particular example, each TPMS sensor signal includes, conveys, or indicates content/information such as, without limitation: a tire pressure measurement or value; a sensor identifier that uniquely identifies the transmitting TPMS sensor within the domain of the TPMS; and a left/right identifier (or, equivalently, a clockwise/counterclockwise identifier) that indicates whether the transmitting TPMS sensor is located on the right or left side of the vehicle. The tire pressure value indicates the measured pressure for that particular tire. The sensor identifier may be a serial number, a string of bits, a code, an alphanumeric string, or the like, which can be processed and interpreted by the TPMS. The TPMS associates other information with the respective sensor identifier, which in turn associates that information with the respective tire. The left/right identifier may be generated in response to the direction of rotation of the respective wheel, where wheels on the left side of the vehicle rotate in a counterclockwise direction and wheels on the right side rotate in a clockwise direction (when the vehicle is moving forward). Many existing TPMS sensors are configured to generate the left/right identifier in response to rotation of the tires using accelerometer and/or gyroscope technologies.

As mentioned previously, process 400 receives, processes, and analyzes the content of the received TPMS sensor signals (query task 416). In this regard, process 400 determines respective RSS values for the received TPMS sensor signals (task 418). For this example, process 400 obtains an RSS value for each received TPMS sensor signal. In practice, the wireless receiver and related processing architecture can be suitably configured to measure the RF energy, power, or other measurable characteristic of the received TPMS sensor signals, where the measureable characteristic is indicative of the RSS. Generally, TPMS sensor signals transmitted by the aft TPMS sensors will have a lower RSS than TPMS sensor signals transmitted by the fore TPMS sensors because the location of the wireless receiver is biased toward the front of the vehicle in this example. Accordingly, the TPMS system can process the RSS values in an appropriate manner to resolve whether the received TPMS sensor signals were transmitted by a fore TPMS sensor or an aft TPMS sensor (task 420).

Task 420 may be executed in various ways, depending upon the implementation of the TPMS system. In one embodiment, task 420 compares each RSS value to one or more threshold RSS values to determine whether the respective TPMS sensor signal originated from a fore or an aft TPMS sensor. For example, a given RSS value may be compared to a high threshold RSS value and, if that RSS value exceeds the high threshold RSS value, process 400 can indicate that the corresponding TPMS sensor signal was transmitted by a fore TPMS sensor. Likewise, the RSS value may be compared to a low threshold RSS value and, if that RSS value does not exceed the low threshold RSS value, process 400 can indicate that the corresponding TPMS sensor signal was transmitted by an aft TPMS sensor. In other words, a relatively high RSS at the wireless receiver indicates transmission by a fore TPMS sensor, while a relatively low RSS at the wireless receiver indicates transmission by an aft TPMS sensor. It should be appreciated that process 400 can perform RSS value comparisons in any appropriate manner, and that the comparisons described here using fixed thresholds are merely exemplary. For example, an RSS value may be evaluated to determine whether it is greater than a threshold value, greater than or equal to a threshold value, greater than a threshold value by at least a specified amount, or the like. Furthermore, an embodiment of process 400 can utilize a single threshold RSS value rather than a high threshold value and a low threshold value. The threshold(s) could likewise be adaptive to account for changing conditions that could affect RSS.

In lieu of (or in addition to) the technique described above, which individually analyzes each RSS value, process 400 may simply assume that higher RSS values correspond to fore TPMS sensors and that lower RSS values correspond to aft TPMS sensors. For example, process 400 may designate two relatively high RSS values and two relatively low RSS values, indicate that received TPMS sensor signals having the relatively high RSS values were transmitted by fore TPMS sensors, and indicate that received TPMS sensor signals having the relatively low RSS values were transmitted by aft TPMS sensors. This technique compares the RSS values against each other rather than against any threshold RSS values. Using either technique, process 400 can assign a fore/aft tire designation to each received TPMS sensor signal if the respective RSS value is relatively high/low.

The fore/aft designation, in conjunction with the left/right indicator, enables the TPMS system to determine the relative location of each TPMS sensor. Accordingly, process 400 may analyze the content of the received TPMS sensor signals to obtain the left/right indicators (task 422). This enables the TPMS system to resolve whether a given TPMS sensor signal was transmitted by a left TPMS sensor or a right TPMS sensor. In addition, process 400 may analyze the content of the received TPMS sensor signals to obtain the respective tire pressure measurements (task 424). The TPMS can then assign appropriate location labels (task 426) to each sensor identifier such that the TPMS can accurately monitor the tire pressure for each wheel. This particular embodiment utilizes the following location labels: left front; right front; left rear; and right rear. In practice, these labels can be rendered on an onboard display element, along with the corresponding tire pressure measurements (using appropriate units, such as PSI). Following task 426, process 400 may be re-entered at query task 402 to continue monitoring the vehicle speed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of operating a tire pressure monitoring system for a vehicle, the tire pressure monitoring system comprising a plurality of tire pressure sensors, each being configured to wirelessly transmit respective sensor signals, a wireless receiver configured to wirelessly receive and process sensor signals transmitted by the tire pressure sensors, the location of the wireless receiver being biased toward the fore or aft of the vehicle, the method comprising:
   wirelessly receiving sensor signals transmitted by the tire pressure sensors, to obtain received sensor signals;
   determining respective received signal strength (RSS) values for the received sensor signals, to obtain a plurality of RSS values; and processing the plurality of RSS values to resolve whether the received sensor signals were transmitted by a fore tire pressure sensor or an aft tire pressure sensor.

2. The method of claim 1, further comprising analyzing content of the received sensor signals to resolve whether the received sensor signals were transmitted by a left tire pressure sensor or a right tire pressure sensor.

3. The method of claim 2, wherein:
each of the sensor signals conveys a sensor identifier that is unique within the tire pressure monitoring system; and
the method further comprises assigning one of a plurality of location labels to each sensor identifier, the location labels consisting of a left front label, a right front label, a left rear label, and a right rear label.

4. The method of claim 1, wherein processing the plurality of RSS values comprises, for each received sensor signal:
comparing its RSS value to a threshold RSS value; and
resolving whether the received sensor signal was transmitted by a fore tire pressure sensor or an aft tire pressure sensor in response to the comparing step.

5. The method of claim 4, wherein:
the location of the wireless receiver is biased toward the fore of the vehicle; and
processing the plurality of RSS values comprises, for each received sensor signal:
comparing its RSS value to at least one threshold RSS value;
indicating that the received sensor signal was transmitted by a fore tire pressure sensor if the RSS value exceeds a high threshold RSS value; and
indicating that the received sensor signal was transmitted by an aft tire pressure sensor if the RSS value does not exceed a low threshold RSS value.

6. The method of claim 4, wherein:
the location of the wireless receiver is biased toward the aft of the vehicle; and
processing the plurality of RSS values comprises, for each received sensor signal:
comparing its RSS value to at least one threshold RSS value;
indicating that the received sensor signal was transmitted by an aft tire pressure sensor if the RSS value exceeds a high threshold RSS value; and
indicating that the received sensor signal was transmitted by a fore tire pressure sensor if the RSS value does not exceed a low threshold RSS value.

7. The method of claim 1, wherein:
the location of the wireless receiver is biased toward the fore of the vehicle; and
processing the plurality of RSS values comprises:
designating two relatively high RSS values and two relatively low RSS values from the plurality of RSS values;
indicating that the received sensor signals having the relatively high RSS values were transmitted by fore tire pressure sensors; and
indicating that the received sensor signals having the relatively low RSS values were transmitted by aft tire pressure sensors.

8. The method of claim 1, wherein:
the location of the wireless receiver is biased toward the aft of the vehicle; and
processing the plurality of RSS values comprises:
designating two relatively high RSS values and two relatively low RSS values from the plurality of RSS values;
indicating that the received sensor signals having the relatively high RSS values were transmitted by aft tire pressure sensors; and
indicating that the received sensor signals having the relatively low RSS values were transmitted by fore tire pressure sensors.

9. The method of claim 1, the wireless receiver being further configured to wirelessly receive and process key fob signals transmitted by a remote key fob for the vehicle, and the method further comprising:
adjusting the wireless receiver to a relatively high sensitivity setting to accommodate reception of key fob signals; and
adjusting the wireless receiver to a relatively low sensitivity setting to accommodate reception of sensor signals transmitted by the tire pressure sensors.

10. The method of claim 9, wherein adjusting the wireless receiver to a relatively low sensitivity is initiated when the vehicle is traveling at greater than a threshold speed.

11. The method of claim 9, wherein adjusting the wireless receiver to a relatively high sensitivity is initiated when the vehicle is traveling at less than a threshold speed.

12. A method of operating a tire pressure monitoring system for a vehicle having a plurality of tire pressure sensors, each being configured to wirelessly transmit respective sensor signals, the method comprising:
wirelessly receiving sensor signals transmitted by the tire pressure sensors, to obtain received sensor signals at an onboard wireless receiver that is biased toward the fore/aft of the vehicle;
determining respective received signal strength (RSS) values for the received sensor signals, to obtain a plurality of RSS values; and
for each of the received sensor signals:
indicating that the received sensor signal was transmitted by a fore/aft tire pressure sensor if the respective RSS value is relatively high; and
indicating that the received sensor signal was transmitted by an aft/fore tire pressure sensor if the respective RSS value is relatively low.

13. The method of claim 12, further comprising analyzing content of the received sensor signals to resolve whether the received sensor signals were transmitted by a left/right tire pressure sensor.

14. The method of claim 12, further comprising analyzing content of the received sensor signals to obtain respective tire pressure measurements.

15. The method of claim 12, the wireless receiver being further configured to wirelessly receive and process key fob signals transmitted by a remote key fob for the vehicle, and the method further comprising optimizing key fob signal reception by the wireless receiver when vehicle speed is less than a low threshold speed.

16. The method of claim 15, further comprising:
adjusting the wireless receiver to a relatively high sensitivity setting to accommodate reception of key fob signals; and
adjusting the wireless receiver to a relatively low sensitivity setting to accommodate reception of sensor signals transmitted by the tire pressure sensors.

17. A tire pressure monitoring system for a vehicle, the system comprising:
a wireless receiver configured to receive tire pressure sensor signals transmitted by a plurality of tire pressure sensors, the location of the wireless receiver being biased toward the fore/aft of the vehicle; and a processing architecture coupled to the wireless receiver, the processing architecture being configured to:
- obtain a received signal strength (RSS) value for each received tire pressure sensor signal; and
- for each of the received tire pressure sensor signals, assign a fore/aft tire designation if the respective RSS value is relatively high, or assign an aft/fore designation if the respective RSS value is relatively low.

18. The system of claim 17, the wireless receiver being further configured to wirelessly receive key fob signals transmitted by a remote key fob for the vehicle, and the processing architecture being further configured to process received key fob signals.

19. The system of claim 18, wherein:
the wireless receiver has an adjustable sensitivity setting;
the wireless receiver is configured with a relatively high sensitivity setting to accommodate reception of key fob signals; and
the wireless receiver is configured with a relatively low sensitivity setting to accommodate reception of tire pressure sensor signals.

20. The system of claim 18, the processing architecture being further configured to process each received tire pressure sensor signal by:
- comparing its respective RSS value to a threshold RSS value; and
- resolving whether the respective tire pressure sensor signal was transmitted by a fore/aft tire pressure sensor in response to the comparing step.

* * * * *